May 22, 1923. 1,456,464
E. ROLLAND
AUTOMATICALLY WORKING IRRIGATION APPARATUS
Filed Aug. 23, 1921 2 Sheets-Sheet 2

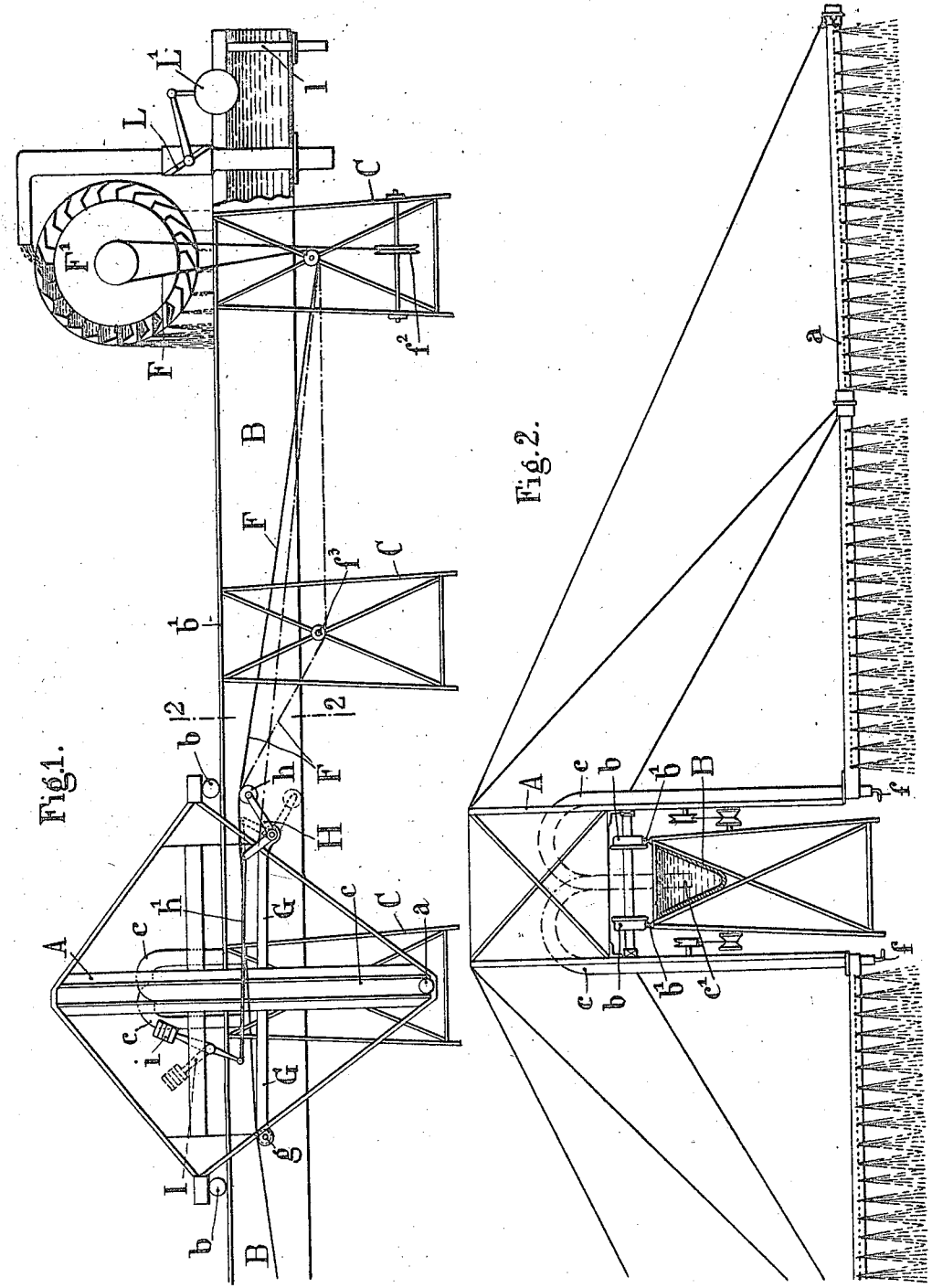

Inventor
E. Rolland
by Lawrence Langner
Atty.

Patented May 22, 1923.

1,456,464

UNITED STATES PATENT OFFICE.

EDMOND ROLLAND, OF BOULOGNE-SUR-SEINE, FRANCE.

AUTOMATICALLY-WORKING IRRIGATION APPARATUS.

Application filed August 23, 1921. Serial No. 494,650.

(GRANTED UNDER THE PROVISIONS OF THE ACT OF MARCH 3, 1921, 41 STAT. L., 1313.)

*To all whom it may concern:*

Be it known that I, EDMUND ROLLAND, a citizen of the French Republic, and a resident of 24 Rue de Sevres, Boulogne-sur-Seine, Seine, France, have invented new and useful Improvements in Automatically-Working Irrigation Apparatus, for which I have filed applications in France April 22, 1920, Patent No. 514,241, and in Germany May 29, 1920 (patent not yet granted), and of which the following is a specification.

The present invention relates to automatically working irrigating or watering apparatus in which the irrigating pipes or sprays are mounted on a carriage to which is imparted by means of an endless cable, a to-and-fro movement along a guiding device arranged transversely of or longitudinally to the surface to be irrigated.

The improvements now designed for these apparatus have for object to render their working completely automatic and reliable and to avoid excessive watering or flooding of the soil at reversal points in the travel such as takes place in known apparatus of this kind.

These improvements have reference in particular to the arrangement upon the feed tube of the watering pipes, of a shut-off device the control of which is dependent upon the movement of the carriage so that the supply to the watering tubes is cut off at each stop or at each return or reversing movement of the carriage.

The annexed drawings show by way of example an irregating apparatus having two horizontal arms provided with the improvements of the present invention.

Figure 1 is a view in elevation.

Figure 2 is a section on line 2—2 of Figure 1.

In the watering apparatus shown by way of example, the watering devices composed of tubes $a$ perforated along one or more lines, are supported by a carriage of which the frame A is mounted on rollers $b$. These rollers travel on rails $b'$ fixed upon the edges of a water-feed gutter or trough B held in place by standards or the like C of any suitable type. The tubes $a$ rigged and stayed in any convenient manner upon the frame A are supplied with water by siphon tubes $c$ of which the free ends $c'$ dip into into the water contained in the trough B. Between the tube $c$ and the tube $a$ is interposed a valve box D comprising a valve $d$ opening upwardly and connected to a piston $d'$ movable in a cylinder $d^2$ fastened to the valve box D, so that by the injection of any suitable fluid into the cylinder $d^2$, the displacement of the piston $d'$ can be effected and consequently the lifting of the valve $d$. Openings $d^3$ permit the free escape of the fluid when the valves are opened.

The working of these valves and pistons is effected by means of a pump E having a plunger piston $e$ operated by an eccentric $f$ fastened to one of the rollers $b$; the delivery pipe $f'$ communicating with the base of the cylinders $d^2$ of each valve box D. This arrangement has for its purpose to prevent the escape of water through the perforated tubes $a$ at the time of stoppage of the carriage, and moreover to prevent the unpriming of the siphons feeding the perforated tubes $a$, by placing the suction orifice of the pump E at a higher level than that of the free ends $c'$ of the tubes $c$ forming the siphon; the delivery of the liquid into the interior of the cylinders $d^2$ stopping before the said extremities $c'$ becomes flush with the level of the liquid in the trough B which causes the valve $d$ to close thus retaining the water in the tube $c$.

This carriage will be, preferably, actuated by an endless cable F operated for example by a water wheel F' put in motion by the feed water of the trough B. This cable of which one of the lengths passes on one side of the trough and the other length upon the other side, is sustained at the ends of the said trough by pulleys $f^2$; moreover, it may be caused to pass over a pulley such as $f^3$ fixed to each of the standards supporting the trough B. Since one of the portions of the cable F (Figs. 1, 5 and 6) is moving from left to right while another portion at the opposite side of the trough B is moving from right to left, reciprocation of the carriage will be obtained if operative connection between the carriage and first one and then the other of these two portions of the cable F is alternately effected.

Figure 5:
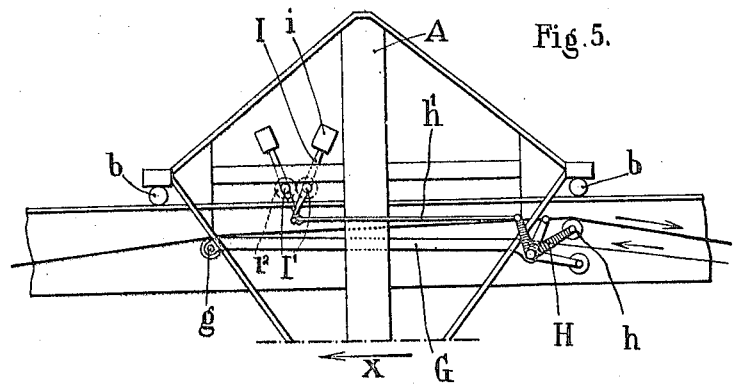
Figure 6:
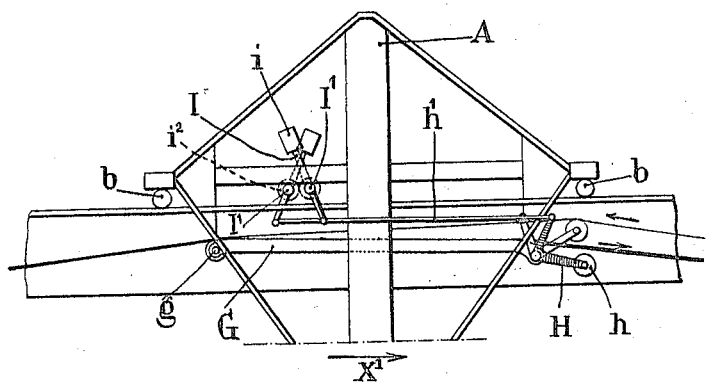
Figure 3:
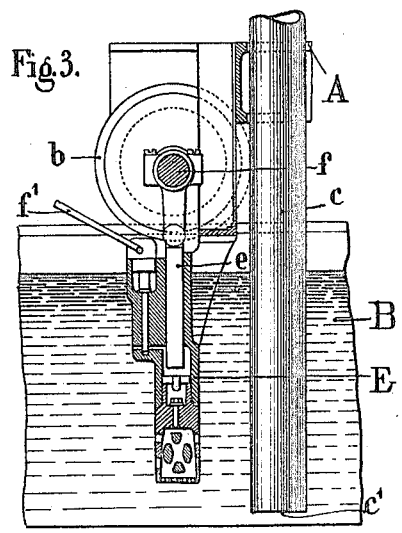
Figure 3 is a vertical section on a larger scale, of a detail of the apparatus.
Figure 4:
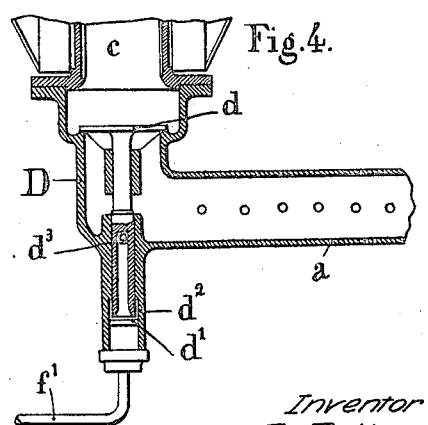
Figure 4 is a section of another detail of the apparatus.

In order to bring this about the carriage carries on either side a friction shoe G having at one extremity a pulley $g$ and at the opposite extremity a bell crank lever H, one of the arms of which carries a pulley $h$ and the other arm of which is connected to a rod $h'$. The rod $h'$ in turn connects at its opposite end with a lever I, said lever having a counterweight $i$ at its free end. Connected to each of these levers I is a shaft I' and on each of these shafts are mounted a pinion $i^2$. These pinions $i^2$ intermesh in such a manner that the movements of the two levers I and consequently of the bell crank levers H are simultaneous but in opposite directions. When one of the levers H is raised for example the front one in Fig. 5 a portion of the cable $f$ which is situated on the same side as this lever is supported by the two pulleys $g$ and $h$ and hence clears the shoe J and runs free without causing any moving of the carriage. The rear lever H, see Fig. 5, is, however, in a lower position so that its pulley $h$ does not engage the cable F, but allows the portion of the cable on its side to frictionally engage its corresponding shoe G. The friction between this part of the cable and the shoe G is sufficient to cause motion of the carriage in the direction of this part of the cable (as indicated by X in Fig. 5). Hence it is seen that by moving the cranks H, first one side portion and then the other side portion of the cable F is made to operatively engage its corresponding shoe on the carriage and cause motion of the carriage first in one direction and then in the other.

At the end of the travel of the carriage in one direction, the direction of motion is reversed by automatically throwing the crank H by means of the pulleys $f^3$ as is explained below.

The supply of water to the trough B is regulated for example by a valve L controlled by a float L'; an overflow pipe $l$ prevents the overflowing of the trough B in case the automatic working of the valve L should be defective.

The working of the apparatus is as follows: The water wheel being started, the endless cable F drives the watering carriage by means of its length or portion engaged in the corresponding shoe G; while the other length or portion is raised by the pulley $h$ (position of lever H shown in full lines) and rolls on the pulley $g$.

At the place where the travel of the carriage is to be reversed, the cable F is passed under a pulley $f^3$ (as shown in dash lines) so that in the vicinity of this point the lever H tilts under the effect of the tension of the cable (position of the lever H shown in dotted lines); the cable engages with the corresponding shoe and is disengaged from the shoe situated on the other side. The travel of the carriage is thus reversed and this can be arranged for at any desired point since the cable can be diverted wherever required.

Since the speed of the carriage at the instant of the reverse becomes momentarily zero, the result is the stoppage of the feed of water to the tubes $a$ by the action of the valves $d$; in this way there is no danger of an excessive distribution of water at the place of the stoppage of the carriage.

The invention is not limited to the details described; it can be applied to any other kind of automatic watering device; I may arrange a single retaining valve for a single feed siphon or for a set of siphons and vary the method of mounting the oscillating shoes upon the frame of the apparatus.

Claims—

1. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, endless cable means for reciprocating the said carriage along the guide rails, together with a shut off device, located in the feed pipe of each water tube, and with means for actuating said shut-off device through the movement of the carriage.

2. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, endless cable means for reciprocating the said carriage along the guide rails, together with a valve, located in the feed pipe of each water tube and, opening in the opposite direction to the direction of flow of the liquid, and with means for opening said valve, through the movement of the carriage, so that the feed of the water tubes is cut off at each stoppage or each reversal of the travel of the carriage.

3. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, endless cable means for reciprocating the said carriage along the guide rails, together with a valve, located in the feed pipe of each water tube and opening in the opposite direction to the direction of flow of the liquid in said pipe, a piston fast with said valve, a pump actuated through the movement of the carriage and operating said piston, for the purpose described.

4. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, endless cable means for reciprocating the said carriage along the guide rails, together with a valve, located in the feed pipe of each water tube and opening in the opposite direction to the direction of flow of the liquid in said pipe, a piston fast with said valve, a pump actuated through the movement of the carriage and operating said piston, the suction port of the pump in the water trough being arranged at a level higher than the suction port of the feed pipes of the water tubes, for the purpose described.

5. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, pulleys carried on the frame, an endless cable guided over said pulleys and the stretches of which pass on either side of the carriage, means for giving a continuous movement to said cable, a friction member secured to the carriage on either side thereof, means for frictionally engaging the cable with either of said members at a predetermined point of the movement of the carriage, so as to drive the said friction member and the carriage,—together with a shut-off device, located in the feed pipe of each water tube, and with means for actuating said shut-off, device through the movement of the carriage.

6. A watering apparatus comprising a frame, guide rails carried thereby across the surface to be watered, a carriage adapted to move on said rails, watering tubes mounted on said carriage, a water trough carried by the frame, feed pipes connected to the watering tubes and dipping into said water trough, pulleys carried on the frame, an endless cable guided over said pulleys and the stretches of which pass on either side of the carriage, means for giving a continuous movement to said cable, a shoe on either side of said carriage, a cable pulley at one end of the shoe, a lever pivoted at the other end of the shoe, a cable pulley at the free end of said lever, means for tilting said lever at a predetermined point of the movement of the carriage, so that the cable, passing over the pulley of said lever frictionally engages with the corresponding shoe, and drives the latter and the carriage, and means connecting both levers at either side of the carriage so that the one is lifted when the other is lowered, together with a shut-off device, located in the feed pipe of each water tube, and with means for actuating said shut-off device through the movement of the carriage.

In testimony whereof I have signed my name to this specification.

EDMOND ROLLAND.

Witnesses:
   T. ARMENGAUD AÎNÉ,
   T. ARMENGAUD.